Patented Oct. 26, 1926.

1,604,774

UNITED STATES PATENT OFFICE.

HARRY B. GOODWIN, OF GRAND JUNCTION, COLORADO, ASSIGNOR TO THE LATIMER-GOODWIN CHEMICAL COMPANY.

INSECTICIDAL COMPOSITION AND THE LIKE.

No Drawing.   Application filed May 6, 1924. Serial No. 711,825.

In the control of insects and parasites on fruit or vegetation by spraying, it is recognized that a thorough wetting of the fruit or leaf surface results in better protection. Until recently it was considered that the best spraying practice consisted in depositing a multitude of small drops over the surface of the fruit or vegetation by means of a fine misty spray. The formation in such case of liquid drops on fruit and leaves is a natural tendency, due partly to the interfacial tension existing between the liquid and the surface of the fruit or leaf. However, aside from other considerations, the resultant spotted effect on fruit, particularly where arsenate of lead is used in the insecticidal composition, gives the fruit a white appearance which is objectionable to some trade, and in certain cases wiping the fruit has been resorted to before it is packed for shipment. This is expensive. It is also claimed that large deposits of lead arsenate prevent proper coloring of the fruit and so decrease its market value. I am aware that it has heretofore been proposed to improve the physical properties of the spray solution by increasing the wetting and covering power of such solution, materials added for this purpose being termed "spreaders," (see Oregon Agricultural College Experiment Station, Bulletin 169, "Insecticide investigations," by Prof. A. L. Lovett). In the bulletin just referred to a number of spreaders has been suggested, calcium caseinate being recommended as one such substance which has an advantage in cheapness, availability, compatibility in most spray combinations, and ease of preparation. Several so-called casein spreaders, which consist in effect of a mechanical mixture of hydrated lime and powdered casein in the proportion of 75 per cent of the former to 25 per cent of the latter, prepared in accordance with directions given in the aforesaid bulletin and other similar publications, have furthermore been on the market for several years past under various trade names, the recommended quantity for use with lead arsenate in all cases known to me being from 1½ to 2 pounds of such spreader to 200 gallons of water, i. e., of the spray mixture.

Various objections have existed to the use of the foregoing spreaders. In the first place they are expensive, the cost being from thirty to forty cents per 200 gallon tank at the current price, viz, twenty cents per pound. In the second place such spreaders are bulky to transport and store. Furthermore, the hydrated lime is subject to carbonization from the carbon dioxide of the air, which tends to render the spreader wholly or partly valueless. Finally, large quantities of inert material are added to the spray mixture and act as an adulterant, decreasing the efficiency of the spray.

The object of the present invention is to provide a new and improved spreader that may be employed with much more satisfactory results and at a decreased cost to the user. To the accomplishment of the foregoing and related ends, said invention, then, consists of the steps and ingredients hereinafter fully described and particularly pointed out in the claims, the following description setting forth but several of the various ways in which my improved spreader may be prepared and used.

I have discovered that equal spreading efficiency to that obtained by any of the above described spreaders is secured by adding a very small quantity of powdered casein to the spray material, with the subsequent addition to the spray mixture, i. e., to such material after it has been intermixed with the prescribed quantity of water, of a small amount of lime at the time of spraying. For example, with dry powdered insecticides of the type of lead arsenate I find it is satisfactory to add eight hundredths (8/100) pound or 1.28 ounces of casein to 4 pounds of lead arsenate, which is the amount of the latter regularly used with 200 gallons of water, to make the standard lead arsenate spray mixture. Such casein is thoroughly mixed with the lead arsenate or equivalent insecticide. Before adding the latter to the foregoing volume of water I first add three tenths (0.3) pound of hydrated lime, $Ca(OH)_2$, or, as an equivalent, four (4) ounces of pure burned lime (CaO), the burned lime having been previously slaked with water to a thin paste; then the insecticidal compound, including the content of casein referred to above, is added to the tank, and the mixture agitated and sprayed. The result, I have found in actual practice with apples, is a perfect wetting of the fruit, and, on drying, the fruit is as uniformly coated without spotting as when from 1½ to 2 pounds of the commercial casein spreader referred to above is used.

The casein, being substantially insoluble, may be added at any point in the manufacture of the insecticide. Thus in the case of lead arsenate it may be put into the precipitating tank before or after the lead arsenate is formed, or it may be mixed with the paste from the filter press or it may be mixed with the dried product before or after grinding.

When mixed with insecticides which are alkaline, of which calcium arsenate is an example, it is unnecessary to add any additional lime at the time of spraying. As already indicated, the casein is practically insoluble in water and so remains inert in all pure water suspensions. I have accordingly found it advantageous to add a soluble deflocculator to cause the insecticide to remain in suspension in neutral solution, for example, tannin or gum arabic.

The fruit grower using an arsenate of lead prepared according to the method I have described will have a choice in his spraying methods. If, as may well happen, he does not desire any special spreading effect during the early season, or, in other words, before the fruit begins to form, he may use the material as it is prepared, obtaining a finely divided product, easily suspendible in water. Later in the season when the fruit is hard to wet he can obtain the desired covering power by merely adding a small amount of lime to his spray tank.

The amount of lime added, it will be understood, should be at least sufficient to convert the otherwise inert casein into the soluble compound, calcium caseinate. While the term "lime" is used herein to connote either the oxide or the hydroxide the amount prescribed for use in my improved insecticidal composition refers to the oxide. It will accordingly be understood that where a lime is employed, in which the amount of such oxide or equivalent hydroxide is less than the total, due to partial carbonization, due account must be taken of the carbonate present since this has no effect on the casein.

While I have referred above to tannin and gum arabic as specific deflocculators it will be understood that these are merely examples of the several substances known to be useful when combined with insecticidal compounds for dispersing the compound and increasing the persistance of suspensibility thereof in water, (see my prior U. S. Patent No. 1,322,008, dated November 18, 1919, also Patent No. 1,393,474 to Robert W. Wilson, dated October 11, 1921).

It should be noted finally that the use of my improved spreader and method of introducing same into the spray mixture is not confined necessarily to spray mixtures designed for insecticidal use exclusively, but may also be applied advantageously to spray mixtures of the sort technically known as fungicides, as for example, lime sulphur solution and Bordeaux mixture. The term "insecticidal" as employed in the claims is accordingly to be understood as comprehending equally such a fungicidal spray mixture.

Other modes of applying the principle of my invention may be employed instead of the one explained, change being made as regards the means and the steps herein disclosed, provided those stated by any one of the following claims or their equivalents be employed.

I therefore particularly point out and distinctly claim as my invention:—

1. In a method of improving the spreading qualities of an insecticidal spray mixture, the steps which consist in adding to the insecticidal compound a very small quantity of casein; then intermixing such compound, when desired for use, with the prescribed quantity of water; and including in the resulting watery spray mixture an ingredient adapted to convert said casein into a soluble compound.

2. In a method of improving the spreading qualities of an insecticidal spray mixture, the steps which consist in adding to the insecticidal compound a very small quantity of casein; then intermixing such compound, when desired for use, with the prescribed quantity of water; and including in the resulting watery spray mixture an amount of lime sufficient to convert said casein into calcium caseinate.

3. In a method of improving the spreading qualities of an insecticidal spray mixture, the insecticidel being an arsenical compound, the steps which consist in adding to the insecticidal compound a very small quantity of casein; then intermixing such compound, when desired for use, with the prescribed quantity of water; and including in the resulting watery spray mixture an ingredient adapted to convert said casein into a soluble compound.

4. In a method of improving the spreading qualities of an insecticidal spray mixture, the insecticide being an arsenical compound, the steps which consist in adding to the insecticidal compound a very small quantity of casein; then intermixing such compound, when desired for use, with the prescribed quantity of water; and including in the resulting watery spray mixture an amount of lime sufficient to convert said casein into calcium caseinate.

5. In a method of improving the spreading qualities of an insecticidal spray mixture, the insecticide being lead arsenate, the steps which consist in adding to the insecticidal compound a very small quantity of casein; then intermixing such compound, when desired for use, with the prescribed quantity of water; and including in the resulting watery spray mixture an ingredient adapted to convert said casein into a soluble compound.

6. In a method of improving the spreading qualities of an insecticidal spray mixture, the insecticide being lead arsenate, the steps which consist in adding to the insecticidal compound a very small quantity of casein; then intermixing such compound, when desired for use, with the prescribed quantity of water; and including in the resulting watery spray mixture an amount of lime sufficient to convert said casein into calcium caseinate.

7. In a method of improving the spreading qualities of a lead arsenate spray mixture, the steps which consist in adding to the lead arsenate not to exceed four per cent of casein; then intermixing said arsenate, when desired for use, with water at the rate of approximately four pounds to two hundred gallons of water; and including in the resulting watery spray mixture sufficient lime to convert said casein into calcium caseinate.

8. In a method of improving the spreading qualities of a lead arsenate spray mixture, the steps which consist in adding to the lead arsenate approximately two per cent of casein; then intermixing said arsenate, when desired for use, with water at the rate of approximately four pounds to two hundred gallons of water; and including in the resulting watery spray mixture lime in an amount not to exceed eight ounces of calcium oxide per two hundred gallons of such mixture.

9. A composition of matter for insecticidal use comprising a substantially insoluble arsenical, a relatively small quantity of substantially insoluble casein admixed therewith, and a deflocculator.

10. A composition of matter for insecticidal use comprising a substantially insoluble arsenical, a relatively small quantity of substantially insoluble casein admixed therewith, and a small quantity of an organic substance capable of serving as a protective colloid.

11. A composition of matter for insecticidal use comprising a substantially insoluble arsenical, a relatively small quantity of substantially insoluble casein admixed therewith, and a small quantity of tannin.

Signed by me this 5th day of May, 1924.

HARRY B. GOODWIN.